United States Patent [19]

Heling et al.

[11] 3,895,665
[45] July 22, 1975

[54] REINFORCEMENT FOR RUBBER TIRES

[75] Inventors: Wilhelm Heling, Bensheim-Auerbach; Rudolf Ammann, Weinheim, both of Germany

[73] Assignee: Firma Carl Freudenberg, Weinheim, Germany

[22] Filed: Dec. 21, 1972

[21] Appl. No.: 317,337

[30] Foreign Application Priority Data
Dec. 24, 1971 Germany.............................. 2164667

[52] U.S. Cl............ 152/357; 152/355; 152/361 DM
[51] Int. Cl............................ B60c 9/16; B60c 9/18
[58] Field of Search.... 152/357, 361 DM, 374, 330, 152/209 R, 354, 358, 355

[56] References Cited
UNITED STATES PATENTS

| | | | |
|---|---|---|---|
| 3,133,583 | 5/1964 | Dobson...................... | 152/361 DM |
| 3,225,812 | 12/1965 | Barrett........................ | 152/361 DM |
| 3,690,364 | 9/1972 | Barassi et al................ | 152/361 DM |
| 3,763,912 | 10/1973 | Bergomi et al.............. | 152/361 DM |

*Primary Examiner*—Drayton E. Hoffman
*Attorney, Agent, or Firm*—Burgess, Dinklage & Sprung

[57] ABSTRACT

A mat comprising non-woven metal fibers entangled with one another in the form of a cohesive mass, said mat having at least a portion of the pores thereof filled with rubber, a tire reinforced with a mat comprising non-woven metal fibers entangled with one another in the form of a cohesive mass, preferably having at least a portion of the pores thereof filled with rubber and having the fibers bonded together with a bonding agent such as a vulcanized mixture of butadiene, styrene, vinyl pyridine-latex and resorcinol resin; the mat of nonwoven metal fibers suitably contains steel fibers with natural or synthetic fibers.

8 Claims, 3 Drawing Figures

REINFORCEMENT FOR RUBBER TIRES

BACKGROUND OF THE INVENTION

1. Field of the Invention

This invention relates to the reinforcement of rubber tires. More particularly, this invention relates to the reinforcement of rubber tires through use of a mat of non-woven metal fibers suitably containing natural or synthetic fibers. This invention also relates to rubber tires so reinforced.

2. Discussion of Prior Art

It is in the prior art to reinforce rubber tires with inserts in the tread, carcass or beads. It is also in the prior art to embed steel cord reinforcements beneath the tread surface of the so-called carcass. As the name implies, this is a cord whose longitudinal threads consist of steel. This steel cord is then covered with layers of rubber and pressed together with same. This results in rubber plies which are reinforced internally with steel.

It is also in the prior art to insert four such steel cord plies into radial tires, the longitudinal direction of the different belts being offset at angles of 15° to 25° from one another. By the designs thus described the so-called "triangle of forces" is created. Research in the tire industry has shown that a two-ply steel belt would suffice for the strength, but it produces insufficient transverse strength and an increased coefficient of wear.

SUMMARY OF THE INVENTION

Broadly, this invention contemplates a mat comprising non-woven metal fibers entangled with one another in the form of a cohesive mass, said mat having at least a portion of the pores thereof filled with rubber.

In a particularly desirable embodiment this invention contemplates a mat comprising non-woven metal fibers entangled with one another in the form of a cohesive mass, said mass containing natural and/or synthetic fibers. Preferably, the non-woven mat of metal fibers and natural or synthetic fibers contains a bonding agent therein which secures fibers to one another to form the cohesive mass. Preferably, the mat further contains rubber which fills at least a portion of the pores thereof.

In accordance with the present invention there is provided a mat which can suitably be employed as a ply in the reinforcement of tires. Specifically, it has been found that several plies of non-woven fabric of this invention can suitably be employed together with tire cords which run longitudinally or radially in a tire whereby to reinforce the same and to provide an improved transverse strength as well as increased riding comfort. The nonwoven mats of the present invention are made of metal fibers having a staple length of between 20 and 100 mm, preferably between 40 and 60 mm. The fiber itself can be of any metal, including metal alloy. Included within this group are both ferrous and nonferrous metals and their alloys. In particular, metal mats can be formed of copper, nickel, iron, steel, manganese, magnesium, stainless steel and the like. Generally speaking, the fibers have a thickness between 0.050 and 0.3 mm, preferably between 0.08 and 0.2 mm. The thickness of the fiber is dependent upon the nature of the material including its density and crimpability or bendability. The overall thickness of the mat will also influence the thickness of the fibers thereof.

In a preferred embodiment the non-woven mat contains natural and/or synthetic fibers. These fibers can be present in an amount between 5 and 70% by weight based upon the entire fiber content of the mat, preferably between 10 and 30%. Suitable fibers for this purpose include polyamide fibers, especially nylon 6 and nylon 6/6, the polyolefins, especially the polyalphaolefins of $C_2$ to $C_8$, especially polyethylene, polypropylene, polybutene-1, and polybutadiene. Other fibers suitable include the thermoplastic fibers such as polyvinyl chloride and the acrylic polymers such as polyacrylonitrile. Similarly, the polyester fibers, especially those heretofore employed as a tire cord, can be used. These include polyesters prepared by reacting or condensing an iso or terephthalic acid moiety with an aliphatic or aromatic polyhydric compound such as ethylene glycol, bisphenol A and the like.

The staple metal fibers employed in the mat are treated by bending the same so as to change the fibers' direction by imparting a bend or crimp having an angle of at least 160°. Generally speaking, the bend or crimp formed has an angle of between 20° and 160°. Preferably there are between one and three crimps per centimeter of length of staple metal fiber. This bending or crimping action is important as the so bent or crimped fibers are ultimately, when formed into the mat, deposited upon a gas-permeable surface wherein a vacuum is applied to the under side.

In a particularly desirable embodiment the mat of fibers is treated with a bonding agent. The weight ratio of fibers to bonding agent, also known as binder, is generally in the range of 95:5 to 50:50. Suitable bonding agents for this purpose include binding agents, which are rubber compatible and serving by this as adhesions agent.

Generally speaking, the bonding agent is applied to the mat and the same is thereafter heated to effect vulcanization of the bonding agent. Of course the subsequent treatment of the mat after the bonding agent has been applied thereto will depend upon the specific nature of the bonding agent.

After the bonding agent is applied, the non-woven fabric, suitably of steel fibers, can then be coated on either side, preferably both sides, in a multiple roll calender with unvulcanized rubber strips which are forced into the mesh of the metallic non-woven fabric and fill at least a portion of the pores or voids in the non-woven mat. After the rubber is vulcanized it can be used to reinforce tire cords and in fact can be used as a tire cord substitute. For instance, after vulcanization, a steel fiber reinforced bond can be obtained which can be used as a steel cord substitute and as a protective insert for the tread in tires. Additionally, the mat can be employed as a conveyor belt.

Thus it has been found that a belt with two plies of steel cord and two plies of the non-woven fabric described herein, wherein the metal is steel, alone or with synthetic fibers, e.g., polyamide, and bonded with a vinyl pyridinelatex and resorcinol resin, provides an improved transverse strength in a rubber tire not heretofore provided. Additionally, an improved riding comfort is brought about by an insulating action attributable to the non-woven fabric. Tires embodying the non-woven fabric are characterized by improved road safety due to the greater contact surface of the tire.

If the steel non-woven fabric is inserted in place of the conventional cord ply between two unvulcanized rubber layers (doughing in the dissolved rubber can be forestalled) the rubber is forced through the pores of the non-woven fabric in the calendering operation that follows. The reinforced rubber layer thus resulting is excellently suited for the manufacture of tires and conveyor belts.

BRIEF DESCRIPTION OF DRAWINGS

Referring to the drawings herein.

DESCRIPTION OF SPECIAL EMBODIMENTS

Figure 1:
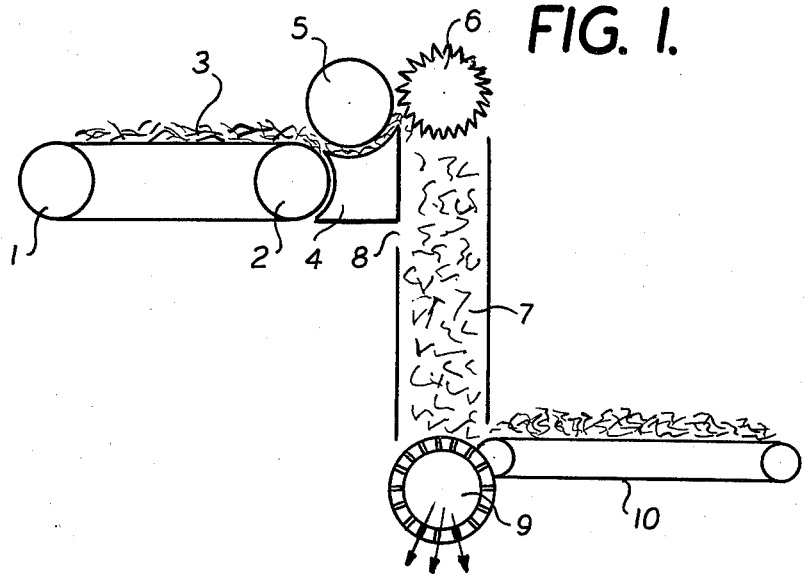
FIG. 1 is a schematic view showing methods by which the non-woven metal fiber mats are prepared.
Figure 2:
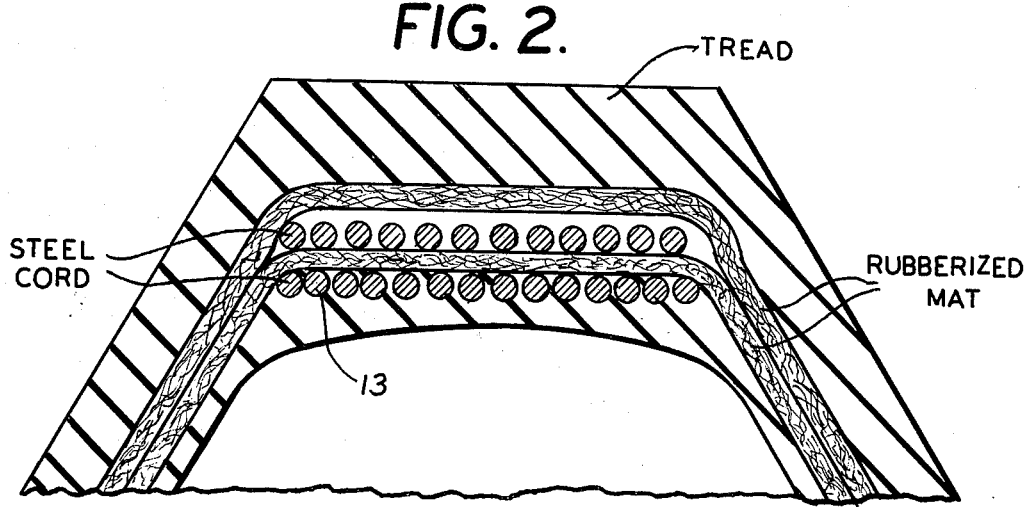
FIG. 2 is a cross section through a tire in which beneath the tread 11 are steel cord plies 12 and 13. Between and above the latter, a reinforcing mat manufactured in accordance with Example 1 below, is incorporated.
Figure 3:
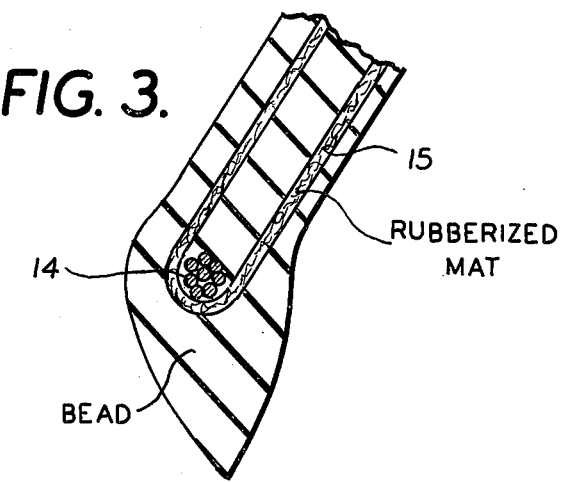
FIG. 3 shows an enlarge cross section of the tire bead. At 14 one sees the threads of a steel cord in cross section. The mat 15, made in accordance with Example 1, is wrapped about this steel cord in the manner described above.

The manufacture of a steel or other metal fiber mat is difficult. One might at first imagine preparing a sliver on a card, as in the manufacture of textile fiber mats, and then laying a plurality of such slivers one on the other with a cross-laying apparatus, until a mat of the desired thickness is formed. It has been found, however, that the metal fibers entangle upon the card clothing, so that the manufacture of a metal fiber mat in this manner is impossible.

Furthermore, the metal fibers are rather smooth. This is a result of their manufacture. First a large number of thin wires of, for example, 60 deniers are spun and then slightly twisted. The "wire" thus produced is cut into pieces of, for example, 4 cm in length. On account of the slight amount of twist, the individual fibers then fall out of this small piece of wire. They will then be in a state such as is produced when a handful of needles are tossed onto a table.

One might think of grasping the pieces of wire with tweezers and dropping them one after the other uniformly over a table until a sheet having a thickness of, for example, 1 cm. This sheet formed of pieces of wire might be called a uniform mat, but its strength is virtually nil, since on account of their smoothness and straightness the fibers are unable to tangle together like natural and synthetic fibers. With the latter an at least slight entanglement is possible, so that the fleece thus formed would have of itself a certain stability sufficient to enable it to be carried on grids and impregnated with foam between rolls in the manner described, for example, in U.S. Pat. Nos. 2,719,802 and 2,719,806.

Now, in order to enable the metal fiber mat to have only this much stability to start with, the metal fibers are given one or more bends by external action, resulting in coil-like or zig-zag shapes. A particularly suitable method for forming mats, which pursuant to the present invention can be used to reinforce tires, is disclosed in copending application Ser. No. 301,543 of Oct. 27, 1972, now abandoned, hereby incorporated herein by reference. Pursuant to the method therein disclosed, a cohesive mat of non-woven metal fibers is formed by initially subjecting short staple lengths of metal fibers to a bending or crimping action. The staple length of the fibers is generally between 20 and 100 mm. The crimped metal fibers are ultimately deposited on a gas-permeable surface and a vacuum is applied to the under side of the surface whereby the bent fibers are entangled together to form a cohesive mass. Preferably, the staple fibers are, prior to being deposited on the gas-permeable surface, passed between the nip of a spiked roller and a generally horizontal endless conveyor belt. The purpose of the spiked roller is to compress and condence the fibers. Thereby the area weight of the fibers increases before they enter a subsequent nip. The spiked roller suitably has spikes of a length between 20 and 60 mm which spikes are inserted into the roller surface at an angle between 30° and 90°.

The so processed staple metal fibers then pass between the nip of a roller and an arcuate surface having the same contour as the roller. The nip is so dimensioned that a pressure between 10 and 40 pounds per square inch is applied to the staple metal fibers passing between the roller and the opposed contoured surface. The compacted and densified fibers are then directed to a space defined by the roller and an opposed toothed wheel rotating in a direction opposite to that of the roller. It is this toothed wheel which imparts the desired bending or crimping.

Thereafter, the fibers can suitably be conveyed through use of a generally vertical pneumatic conveyor chute on a surface which is gas-permeable. Generally, they are pneumatically conveyed at a rate between 2 and 30 meters per second, preferably between 10 and 20. They strike the gas-permeable surface with great force. Negative pressure is maintained at the under side of the gas-permeable surface so that the fibers are intimately drawn together and entangled. Entanglement is possible because of the previous bending and crimping treatment to which the metal fibers have been subjected. Suitably the gas-permeable surface can be in the form of a roller. There is thus produced a mat which is made of non-woven metal fibers, which mat is in the form of a cohesive mass, i.e., when the ends of the mat are pulled, the mat does not readily come apart due to the entanglement of the fibers with one another within the mat.

Referring to FIG. 1, an advantageous bending can be formed in the manner described below:

First the smooth fibers are thrown onto a conveyor belt 3 continuously circulating around the rolls 1 and 2. Directly behind roll 2, at a very short distance therefrom, a brake shoe-like block 4 is disposed. Between the brake shoe 4 and the roll 5 there is only a narrow gap. The mat lying on the conveyor belt 3 is carried into this gap between components 4 and 5. Since the gap is very narrow, a pressure is exerted on the "steel mat." It is therefore picked upwardly to the right by the roll turning in the direction of the arrow. To facilitate entrainment, the roll 5 may also have a fluted surface. After the fibers have passed the upper right end of the brake shoe 4, they fall downwardly. But at this point there is provided the toothed roll 6 which rotates contrary to the direction of roll 5. The smooth fibers reaching the upper end of the brake shoe 4 pass into the teeth of roll 6 where they are bent one or more times. Bent fibers then drop into the slantingly disposed passage 7. At the same time a strong current of air is delivered into this passage from 8. The bent fibers are thus carried in a stream of air to a perforated roll 9 in whose interior a vacuum prevails. On the surface of the roll 9 there now forms a uniform mat in which the fibers are curled, bent and entangled with one another. One quarter to half a revolution of the perforated roll 9 later this mat has again left the surface of same and passes onto the conveyor belt 10. Additional working can be performed by methods of the prior art. It is possible, for example, to spray a binding agent into the metal mat. On account of the open structure a uniform distribution of the binding agent takes place within the mat.

The mat can then have its pores filled, at least in part, with unvulcanized rubber. The amount of rubber would generally be between 50 and 95% by weight, based upon the weight of the untreated finished fibrous mat. Thereafter the unvulcanized rubber is subjected to vulcanization which provides vulcanized rubber in the fibrous mat in an amount between 50 and 95% by weight, based upon the weight of the finished rubber-containing mat.

As indicated above, the fibrous mat can be initially treated with a bonding agent. Suitably, the bonding agent is a mixture of butadiene, styrene, vinyl pyridine-latex and resorcinol resin. This mixture can have a composition within the following ranges:

| Component | Broad | Preferred |
| --- | --- | --- |
| Butadiene | 40 to 60 | 100 to 150 |
| Styrene | 10 to 30 | 25 to 75 |
| Vinyl pyridine-latex | 20 to 30 | 50 to 75 |
| Resorcinol resin | 15 to 30 | 35 to 75 |

After the same is treated with such a latex, it is dried at a temperature of between 110° and 180°C to effect condensation thereof.

The following example describes the preparation of a new reinforcement of tires using steel fibers.

A random fiber mat of 80% steel fibers (brass plated) weighing 200 g/m², undulated, thickness 0.2 mm/30 mm length, 20% nylon 6/6, 20 dtex/40 mm long, is sprayed with a mixture of butadiene, styrene, vinyl pyridine latex and resorcinol resin, and dired at 160°C, whereupon vulcanization of the binding agent also takes place.

Composition of the mixture

| | Weight parts Aqueous form | Weight parts of dry substance |
| --- | --- | --- |
| Bunatex VP, 40% solution | 250 | 100 |
| Vulkadur T, 40% solution | 50 | 20 |
| Formaldehyde solution, 30% | 20 | 6 |
| Condensation water or distilled water | 310 | — |
| | 630 | 126 |

In the end product the ratio of fiber to binder is 80 : 20. This non-woven fabric is then rubberized on both sides in a multiple roll calender with unvulcanized rubber at a weight of 500 g/m² each side. The unvulcanized rubber completely penetrates into the pores and meshes of this mat, so that after the vulcanization of the rubber a fiber-reinforced band has developed, which may be used as a substitute insulating insert and steel cord, as a stiffening bead insert, or as a conveyor belt core material.

As stated above, natural or synthetic fibers can be present in the non-woven fabric. These fibers suitably have a staple length between 20 and 120 mm and a denier of between 6 and 40.

The mat employed in the tires can suitably have a thickness between 1 and 5 mm, preferably between 2 and 3 mm. It can have between 20 and 90 metal fibers per cm². What is claimed is:

1. A tire comprising a thread and a carcass portion, said carcass portion reinforced by a non-woven mat, said mat comprising randomly disposed linearly deformed metal fibers entangled with one another in the form of a cohesive mass, said metal fibers being in the form of staple fibers having a staple length up to 100 mm. and a thickness of 0.05 to 0.3 mm, said mat having pores between said metal fibers through the thickness of said mat, said pores containing rubber.

2. A tire according to claim 1 wherein the pores of said mass are filled with unvulcanized rubber.

3. A tire according to claim 2 wherein, in addition to said unvulcanized rubber, said mat contains a bonding agent.

4. A tire according to claim 2 wherein the metal of said metal fibers is steel.

5. A tire according to claim 4 which comprises a plurality of steel cords and a plurality of said mat.

6. A tire according to claim 5 comprising two plies of steel cords and two plies of said mat comprising non-woven metal fibers entangled with one another in the form of a cohesive mass.

7. A tire according to claim 6 wherein at least a portion of the pores of said mat are filled with unvulcanized rubber.

8. A tire according to claim 5 wherein at least a portion of the pores of the mat are filled with unvulcanized rubber such that the weight percent of rubber in the mat is between 50 and 95% by weight.

* * * * *